United States Patent
Ramamurthy

(10) Patent No.: US 10,516,687 B1
(45) Date of Patent: Dec. 24, 2019

(54) NETWORK TRAFFIC SPIKE DETECTION AND MANAGEMENT

(71) Applicant: Amazon Technologies, Inc., Seattle, WA (US)

(72) Inventor: Pratap Ramamurthy, Fremont, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 235 days.

(21) Appl. No.: 15/624,562

(22) Filed: Jun. 15, 2017

(51) Int. Cl.
*H04L 29/06* (2006.01)
*H04L 12/26* (2006.01)
*H04L 29/08* (2006.01)
*H04L 12/927* (2013.01)
*H04L 12/911* (2013.01)

(52) U.S. Cl.
CPC ...... *H04L 63/1425* (2013.01); *H04L 43/0882* (2013.01); *H04L 63/1408* (2013.01); *H04L 63/1433* (2013.01); *H04L 47/803* (2013.01); *H04L 47/824* (2013.01); *H04L 67/025* (2013.01)

(58) Field of Classification Search
None
See application file for complete search history.

(56) References Cited

U.S. PATENT DOCUMENTS

| 8,042,171 B1 * | 10/2011 | Nordstrom | H04L 63/1441 726/13 |
| 9,692,811 B1 * | 6/2017 | Tajuddin | H04L 67/10 |
| 2017/0111233 A1 * | 4/2017 | Kokkula | H04L 41/145 |

* cited by examiner

*Primary Examiner* — Andrew J Steinle
(74) *Attorney, Agent, or Firm* — Knobbe, Martens, Olson & Bear, LLP

(57) ABSTRACT

Systems and methods are described to predict spikes in requests for content on a computing network based on referrer field values of prior requests associated with spikes. Specifically, a traffic spike prediction service is disclosed that can analyze information regarding past requests on the computing network to detect a spike in requests to a content item, where a significant number of request within the spike include a common referrer field value. The traffic spike prediction service can then detect a request to a second content also including the common referrer field value, and predict that a spike is expected to occur with respect to the second content. The traffic spike prediction service can manage the expected spike by increasing an amount of computing resources available to service requests to the second content and by marking traffic of the expected spike as likely legitimate, as opposed to malicious.

21 Claims, 6 Drawing Sheets

NETWORK TRAFFIC SPIKE DETECTION AND MANAGEMENT

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

Content providers (such as businesses, artists, media distribution services, etc.) can employ a series of interconnected data centers to deliver content in the form of data objects (e.g., representing web sites, web content, or other digital data) to users or clients. These interconnected data centers are sometimes referred to as "content delivery networks" (CDNs) or content delivery systems. Existing routing and addressing technologies can enable multiple data centers associated with a content delivery system to provide similar or identical data objects to client computing devices. In some instances, each data center providing a set of data objects may be referred to as a point-of-presence ("POP"). Alternative configurations of a device or devices may also service as a POP to provide a set of data objects. For example, a POP may correspond to a single computing device, or to a collection of computing devices (e.g., physically collocated within a "rack" or distributed in different locations). A content delivery system can maintain POPs over a wide area (or worldwide) to enable the system to efficiently service requests from clients in a variety of locations.

One common difficulty in providing data over a communication network is a disparity between the number of requests for content and the computing resources available to devices serving content. If the number of requests for content overwhelms those computing resources, the content often because unavailable to many or all requesting users. In some instances, the number of requests can increase rapidly, causing a "traffic spike" that provides little opportunity for manual intervention to increase the computing resources available to devices serving content. While such traffic spikes are sometimes legitimate, the effects of a traffic spike have also been exploited to create "network attacks," which seek to render content unavailable on a computing network. One mechanism for doing so is a "denial of service" (DoS) attack. These attacks generally attempt to make a target computing device or network resource, such as a web site, unavailable to legitimate clients. One common instance of a DoS attack involves saturating the target device or network with external communications requests, such that it cannot respond to legitimate traffic, or it responds so slowly as to be rendered effectively unavailable. Because of the number of requests required to mount such an attack, responsibility for implementing the attack is often distributed across many computing devices. These distributed attacks are therefore known as "distributed denial of service" (DDoS) attacks.

Various techniques have been proposed for mitigating the effects of traffic spikes. Often, techniques focus on attempting to identify and isolate malicious and illegitimate traffic, such as by identifying patterns in malicious traffic that do not exist in legitimate traffic. However, perpetrators of network attacks continue to increase the sophistication of network attacks, making identification of network attacks difficult. Moreover, prior techniques are often responsive in nature, seeking to identify a presently occurring traffic spike, and to increase the amount of computing resources available to service that traffic. Due to this responsive nature, these techniques often fail to prevent at least some disruption in the availability of content.

DETAILED DESCRIPTION

Figure 1:
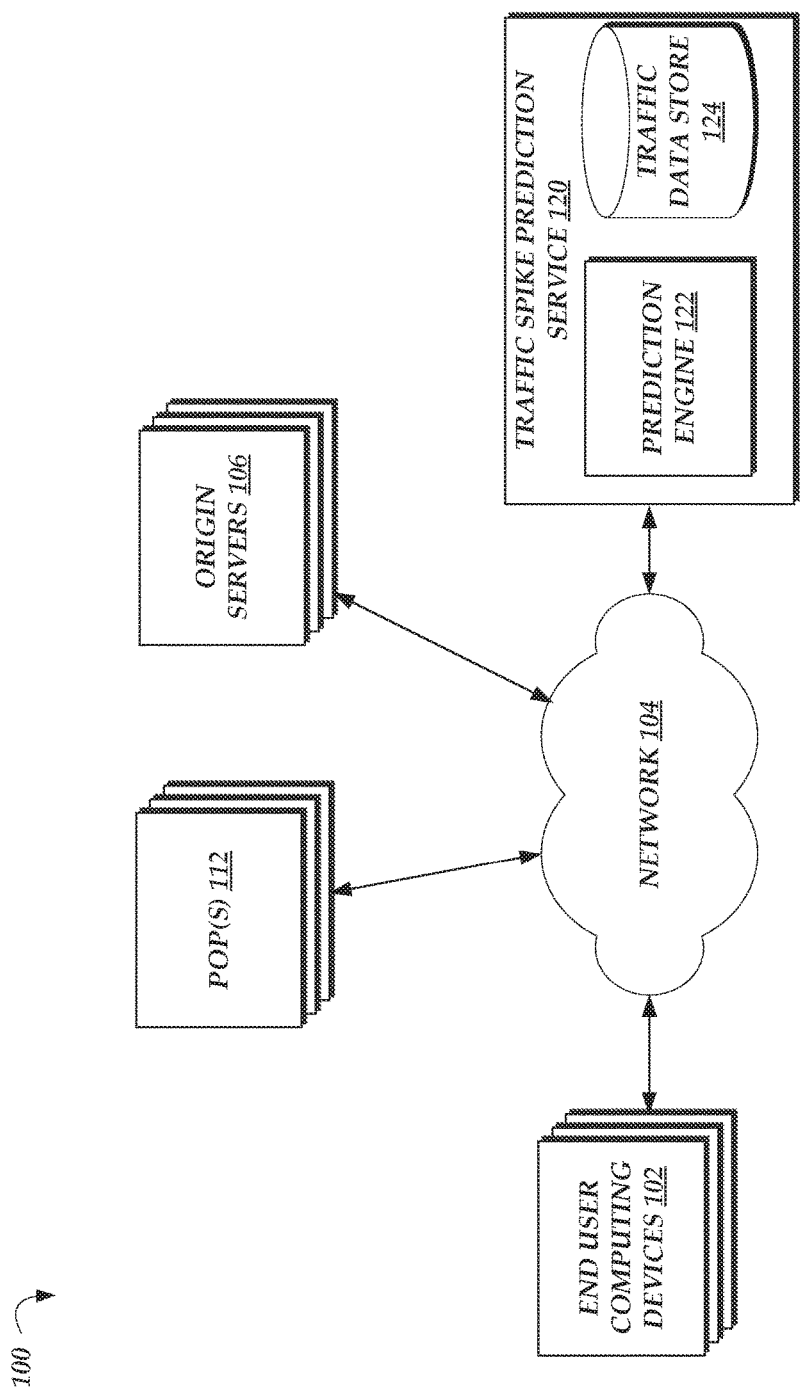
FIG. 1 is a block diagram depicting an illustrative logical network including end user computing devices, origin servers, and POPs, as well as a traffic spike prediction service configured to predict legitimate spikes in traffic relate to content provided by the POPs or origin servers.

Generally described, aspects of the present disclosure relate to detecting and managing spikes in legitimate requests for content on a communication network. More specifically, aspects of the present disclosure relate to analyzing data regarding historical network traffic to determine "traffic-spike referrers"—entities whose actions often result in a spike of legitimate requests to access content—and to predict or rapidly detect subsequent traffic spikes by identifying traffic associated or stemming from the traffic-spike referrers. Aspects of the present disclosure further relate to managing subsequent traffic spikes, such as by allocating additional computing resources to service subsequent traffic spikes or by notifying network-attack protection devices that the traffic spike includes legitimate traffic. As used herein, traffic-spike referrers generally refer to entities that are identified (directly or indirectly) within a request to access network content as a source of a referral to that network content, and whose referrals are often associated with spikes of traffic to network content. Traffic-spike referrers may correspond, for example, to users of a social networking service, to news entities, to specific web sites (e.g., news aggregator or discussion web sites), or to other sources of traffic (e.g., a particular application executing on client computing devices, such as a popular mobile device application). Traffic-spike referrers may post "links" (e.g., hypertext markup language, or "HTML," hyperlinks) to network content to a network resource, such as a social networking site or news aggregator, thus enabling other users to select the link and retrieve the network content. Because of the popularity of traffic-spike referrers, posting of a link to network content by a traffic-spike referrer may cause a spike of traffic to the network content. In many instances, these spikes may overwhelm computing resources associated with the network content. Moreover, these spikes may be incorrectly identified as malicious, which may result in requests of a spike being incorrectly discarded or redirected away from the desired network content. The present disclosure addresses these problems, by providing a mechanism to automatically identify traffic-spike referrers and manage spikes created by actions of the referrers by increasing the network resources available to provide content referenced by a traffic-spike referrer and by notifying network-attack detection systems of an predicted legitimate spike in network traffic to the content.

Specifically, the present disclosure describes a traffic spike prediction service configured to obtain historical information regarding requests for content, and to analyze that information to identify traffic-spike referrers. The historical information may be obtained from a number of data sources providing access to content, including POPs (e.g., associated with a CDN) and origin servers. Thereafter, the traffic spike prediction service may inspect the historical information to identify spikes in requests for a specific network content, such as network content associated with a specific uniform resource identifier ("URI"). As used herein, the term "traffic spike" (or simply "spike") is generally used to refer to a rapid increase in requests to obtain a specific network content. Illustrative mechanisms for detecting spikes will be discussed in detail below. However, in brief, a spike may occur when a number of requests for a specific content increases, in a given time period, by a threshold percentage (e.g., five standard deviations) over a prior average number of requests for that content, and later reverts to or near that average number of requests (e.g., to a stable number of requests much lower than a peak number of requests in the traffic spike). When such a spike is detected, the traffic spike prediction service may further inspect requests for the content to determine whether a significant portion (e.g., 60% or more) of those requests identify an individual traffic-spike referrer, thus indicating that the requests have been caused by actions of the traffic-spike referrer. In one embodiment, a request may identify a traffic-spike referrer by use of the HTML "referer" field, which identifies the URI of a web page that linked to the content being requested. The referer field, for example, may identify a URI of a web page associated with a social network account that posted a link to the content for which requests have spiked. As such, if a significant portion of requests for the content share a common HTML referer value, the traffic spike prediction service may identify the social network account as a traffic-spike referrer. In another embodiment, a request may identify a traffic-spike referrer by use of other metadata associated with a network request, as discussed in more detail below.

After identifying traffic-spike referrers, the traffic spike prediction service 120 may inspect additional network traffic information in order to predict or rapidly identify traffic spikes to additional content, even before traffic volumes to the additional content have reached a level constituting a spike. Specifically, the traffic-spike referrer may inspect network traffic information to identify requests for additional content (e.g., content not associated with a current spike) that identify a previously determined traffic-spike referrer. Because the traffic-spike referrer has been identified by the traffic spike prediction service as a likely source of prior traffic spikes, the traffic-spike prediction service may determine that the additional content is also likely to experience a spike in requests. For example, where past traffic spikes were caused by the traffic-spike referrer posting a link to prior content on a popular social network site, identification of the traffic-spike referrer in requests for additional content may indicate that the traffic-spike referrer has posted a link to the additional content on the popular social network site, and that a spike for the additional content is also likely.

Subsequent to determining that a spike is likely to occur with respect to the additional content, the traffic spike prediction service 120 may manage handling of requests for the additional content, to reduce or negate negative effects that may otherwise occur under spike conditions. In one embodiment, the traffic spike prediction service 120 may communicate with a provider of the additional content (e.g., a CDN) to increase the availability of computing resources serving the additional content. For example, where a provider serves content via virtual computing device, the traffic spike prediction service may request that the provider create new virtual computing devices that can handle requests to access content. As another example, where a provider utilizes load balancing to distribute requests for various content across device, the traffic spike prediction service may request that the load balancing be reconfigured to enable more devices to provide the additional content. Because spike prediction can occur based on a single request to access the additional content, the provider than thus be enabled to reconfigure the devices providing the additional content even before requests for the additional content reach levels that would constitute a "spike."

Additionally or alternatively, the traffic spike prediction service may notify network attack mitigation devices associated with the additional content that a spike of traffic to the additional content is likely, and that such at least a portion of such a spike is likely to represent legitimate request for the content. Illustratively, network attack mitigation devices (e.g., routers of a CDN or devices working in conjunction with those routers) may generally be configured to detect rapid increases of traffic requesting a particular content, and to inspect and potentially identify those requests as malicious. This functionality may serve, for example, to protect against DoS attacks, which, like legitimate spikes, generally result in a rapid increase in the number of requests for content targeted by the attack. Because detection of malicious requests is generally imperfect, the network attack mitigation devices may mistakenly identify legitimate traffic as malicious. Moreover, even when requests are correctly identified, the network attack mitigation devices must generally use at least some amount of computing resources to inspect packets and determine whether the packets are malicious. However, in the instance that requests are associated with a traffic-spike referrer, it may be generally unlikely that such requests are associated with a network attack. Thus, the traffic spike prediction service may notify network attack mitigation devices that requests to an additional content for which a spike is detected should not be classified as malicious. In some instances, the traffic spike prediction service may further notify the network attack mitigation devices of the traffic-spike referrer, such that the network attack mitigation device may "whitelist" traffic identifying the traffic-spike referrer (e.g., while still performing normal inspection or identification for other traffic).

In some embodiments, the traffic spike prediction service may further be configured to predict a magnitude of a traffic spike, or a duration of the traffic spike and a distribution of traffic across that duration. For example, the traffic spike prediction service may predict that a specific amount of traffic (e.g., n thousands of requests) will occur with respect to a traffic spike, predict a period of the spike (e.g., m hours), and predict a distribution of that traffic over the period. The traffic spike prediction service may provide this information to network attack mitigation devices and providers of content associated with the spike to facilitate the functionalities described above (e.g., whitelisting of traffic as legitimate and managing of computing resources available to service traffic under spike conditions).

While embodiments are discussed here that generally relate to request for content items, one skilled in the art will appreciate that traffic spikes may be formed by communications other than requests. For example, spikes to a network object (e.g., a data object association with a given URI) may include communications to the network object that do not require a response (e.g., "push" style notifications or other messages not constituting a request). Accordingly, embodiments of the present disclosure may enable traffic spikes to be detected on the basis of these other communications to a network object in a similar manner to that described herein with respect to requests to content items.

As will be appreciated by one of skill in the art in light of the description above, the embodiments disclosed herein substantially increase the ability of computing systems, such as CDNs, to detect or predict traffic spikes, and to rapidly and effectively service network content under traffic spike conditions. Specifically, the embodiments disclosed herein enable detection or prediction of traffic spikes based on traffic-spike referrers, as identified based on analysis of prior traffic, and further enable the detection of future spikes when requests associated with the traffic-spike referrers are identified. Because detection of future spikes potentially requires only a single request to content, this detection mechanism improves significantly on systems that merely respond to a presently detected spike, after volumes have reached "spike" levels. Moreover, the embodiments described herein can function to identify legitimate traffic based on identification of a traffic-spike referrer in the traffic, thus improving on existing techniques for distinguishing malicious from legitimate traffic (which generally focus on identifying malicious traffic directly). Thus, the presently disclosed embodiments represent an improvement in the functioning of content distribution systems. Moreover, the presently disclosed embodiments address technical problems inherent within computing systems; specifically, the limited capacity of computing systems to transmit information, as well as the limited ability of such systems to process network-based requests. These technical problems are addressed by the various technical solutions described herein, including the implementation of a traffic spike prediction service that identifies traffic-spike referrers and utilizes information from subsequent requests associated with the traffic-spike referrers to identify future traffic spikes. Thus, the present application represents a substantial improvement on existing network systems and computing systems in general.

The foregoing aspects and many of the attendant advantages of the present disclosure will become more readily appreciated as the same become better understood by reference to the following, when taken in conjunction with the accompanying drawings.

FIG. 1 is a block diagram depicting an illustrative logical network 100 including multiple end user computing devices 102, origin servers 106, and POPs 112 in communication with a traffic spike prediction service 120 via a network 104.

While the end user computing devices 102, origin servers 106, and POPs 112 are shown as grouped within FIG. 1, the end user computing devices 102, origin servers 106, and POPs 112 may be geographically distant, and independently owned or operated. For example, the end user computing devices 102 could represent a multitude of users in various global, continental, or regional locations accessing the origin servers 106 and POPs 112. Further, the origin servers 106 and POPs 112 could represent a multitude of related or distinct parties that provide data objects, representing web sites, multimedia, or other digital, network-deliverable content, to the end user computing devices 102. The traffic spike prediction service 120 may operate as an independent service in communication with the devices of FIG. 1, or may be operated by an entity also associated with the POPs 112 or origin servers 106. Accordingly, the groupings of end user computing devices 102, origin servers 106, and POPs 112 within FIG. 1 is intended to represent a logical, rather than physical, grouping. For the purposes of description, it will be assumed that the POPs 112 are associated with one or more CDNs, which operate to facilitate access to content of the origin services 106. However, one skilled in the art will appreciate that embodiments of the present disclosure may enable traffic spike prediction on any network including devices making content available via a communication network (e.g., a network including only POPs 112 or only origin servers 106).

Network 104 may be any wired network, wireless network, or combination thereof. In addition, the network 104 may be a personal area network, local area network, wide area network, cable network, satellite network, cellular telephone network, or combination thereof. In the example environment of FIG. 1, network 104 is a global area network (GAN), such as the Internet. Protocols and components for communicating via the other aforementioned types of communication networks are well known to those skilled in the art of computer communications and thus, need not be described in more detail herein. While each of the end user computing devices 102, origin servers 106, POPs 112, and traffic spike prediction service 120 is depicted as having a single connection to the network 104, individual components of the end user computing devices 102, origin servers 106, POPs 112 and traffic spike prediction service 120 may be connected to the network 104 at disparate points. Accordingly, communication times and capabilities may vary between the components of FIG. 1.

End user computing devices 102 may include any number of different computing devices capable of communicating with the POPs 112 or origin servers 106 to access data objects stored at the POPs 112 or origin servers 106. For example, individual end user computing devices 102 may correspond to a laptop or tablet computer, personal computer, wearable computer, server, personal digital assistant (PDA), hybrid PDA/mobile phone, mobile phone, electronic book reader, set-top box, camera, digital media player, and the like. Using end user computing devices 102, clients may interact with and access data objects on the POPs 112 or origin servers 106 associated with various content providers. For example, after requesting a data object, the end user computing devices 102 may be routed to a POP 112 configured to provide that data object on behalf of the origin server 106. In other instances, after requesting a data object, the end user computing devices 102 may be routed to an origin server 106. Various mechanisms for routing of end user computing devices 102 to a provider of content requested by the end user computing devices 102 are known within the art, and thus will not be described in detail herein.

Origin servers 106 may include any computing device owned or operated by a provider and configured to serve as a primary source for data objects of the provider. For example, origin servers 106 may include servers hosting web sites, streaming audio, video, or multimedia services, data analytics services, or other network-accessible services. The origin servers 106 may include primary versions of data objects, which may be retrieved by various POPs 112 for subsequent transmission to the end user computing devices 102. As is discussed below, origin servers 106 may communicate with the traffic spike prediction service 120 to provide that service 120 with information regarding requests for content received at the origin servers 106 from end user computing devices 102.

To receive and handle requests for data objects from end user computing devices 102 a plurality of POPs 112 can be provided (e.g., by a CDN). Each POP 112 may include one or more edge servers collectively configured to maintain all or a portion of the data objects associated with the various providers, as made available by the origin servers 106. Each edge server may include any number of processors, data stores, or networking components operating in conjunction to facilitate retrieval of content. In one embodiment, the edge servers may implement network attack detection and mitigation mechanisms, which mechanisms attempt to detect malicious traffic associated with a network attack. In another embodiment, the edge servers may communicate with other computing devices within the POP 112 that implement network attack detection and mitigation mechanisms Like the origin servers 106, POPs 112 may also communicate with the traffic spike prediction service 120 to provide that service 120 with information regarding requests for content received at the POP 112 from end user computing devices 102.

Information regarding requests for content received at either or both the POPs 112 and the origin servers 106 may be stored in a traffic data store 124 of the traffic spike prediction service 120. The traffic data store 124 may include one or more hard disk drives (HDDs), SSDs, virtual disk drives, tape drives, network attached storage (NASs) devices, or any other persistent or substantially persistent storage component that operate to store information received from the POPs 112 and the origin servers 106.

After receiving the information from either or both the POPs 112 and the origin servers 106, the traffic spike prediction service 120 can utilize a prediction engine 122 to analyze the information to implement the functionalities described herein. The prediction engine 122 may be implemented, for example, as software executed on a server corresponding to the traffic spike prediction service 120. Algorithms and mechanisms for implementing functionalities associated with the prediction engine 122 are described in more detail below. In brief, the prediction engine 122 may identify, from the traffic information within the traffic data store 124, a spike of traffic associated with a specific requested content (e.g., a specific URI) for which a significant portion identifies a common entity as a referral source. The prediction engine 122 may then identify requests for additional content also identifying the entity as a referral source, and predict that a spike is or will soon occur with respect to the additional content. The prediction engine 122 may communicate with the POPs 112 and the origin servers 106 to notify them of the spike, thus enabling the POPs 112 and the origin servers 106 to take actions to mitigate potential negative effects of the spike (e.g., by allocating additional resources to serve requests for the additional content or by whitelisting requests for the additional content to prevent expenditure of computing resources in inspecting the requests as potentially malicious).

It will be appreciated by those skilled in the art that the traffic spike prediction service 120 may have fewer or greater components than are illustrated in FIG. 1. For example, the traffic spike prediction service 120 may include or be in communication with a hosted service environment including one or more rapidly provisioned and released computing resources, such as computing, networking and/or storage devices. A hosted computing environment may also be referred to as a cloud computing environment.

In one embodiment, the hosted computing environment may also implemented one or more of the POPs 112 or origin servers 106. For example, the hosted computing environment may provide a POP 112 or origin server 106 with access to additional computing resources, such as data storage devices, that may be utilized on-demand by the components of the POP 112 or origin server 106 to dynamically increase the computing resources available to the POP 112 or origin server 106. In one embodiment, the POPs 112 or origin servers 106 may be implemented wholly or in part by virtual machine instances implemented on physical computing devices within a hosted computing environment. Thus, the number of server computing devices or data stores included within the POPs 112 or origin servers 106, as well as the computing resources available to those server computing devices or data stores, may be modified during operation of the POPs 112 or origin servers 106 according to the needs and configuration of the POPs 112 or origin servers 106.

Thus, the depiction of the traffic spike prediction service 120, POPs 112, and origin servers 106 in FIG. 1 should be taken as illustrative. Further, any one or more of traffic spike prediction service 120, POPs 112, and origin servers 106 may be embodied in a plurality of components, each executing an instance of the respective traffic spike prediction service 120, POPs 112, and origin servers 106. A server or other computing component implementing any one of the respective traffic spike prediction service 120, POPs 112, and origin servers 106 may include a network interface, memory, processing unit, and computer readable medium drive, all of which may communicate with each other by way of a communication bus. The network interface may provide connectivity over the network 104 and/or other networks or computer systems. The processing unit may communicate to and from memory containing program instructions that the processing unit executes in order to operate the respective traffic spike prediction service 120, POPs 112, and origin servers 106. The memory may generally include RAM, ROM, other persistent and auxiliary memory, and/or any non-transitory computer-readable media.

Figure 2:
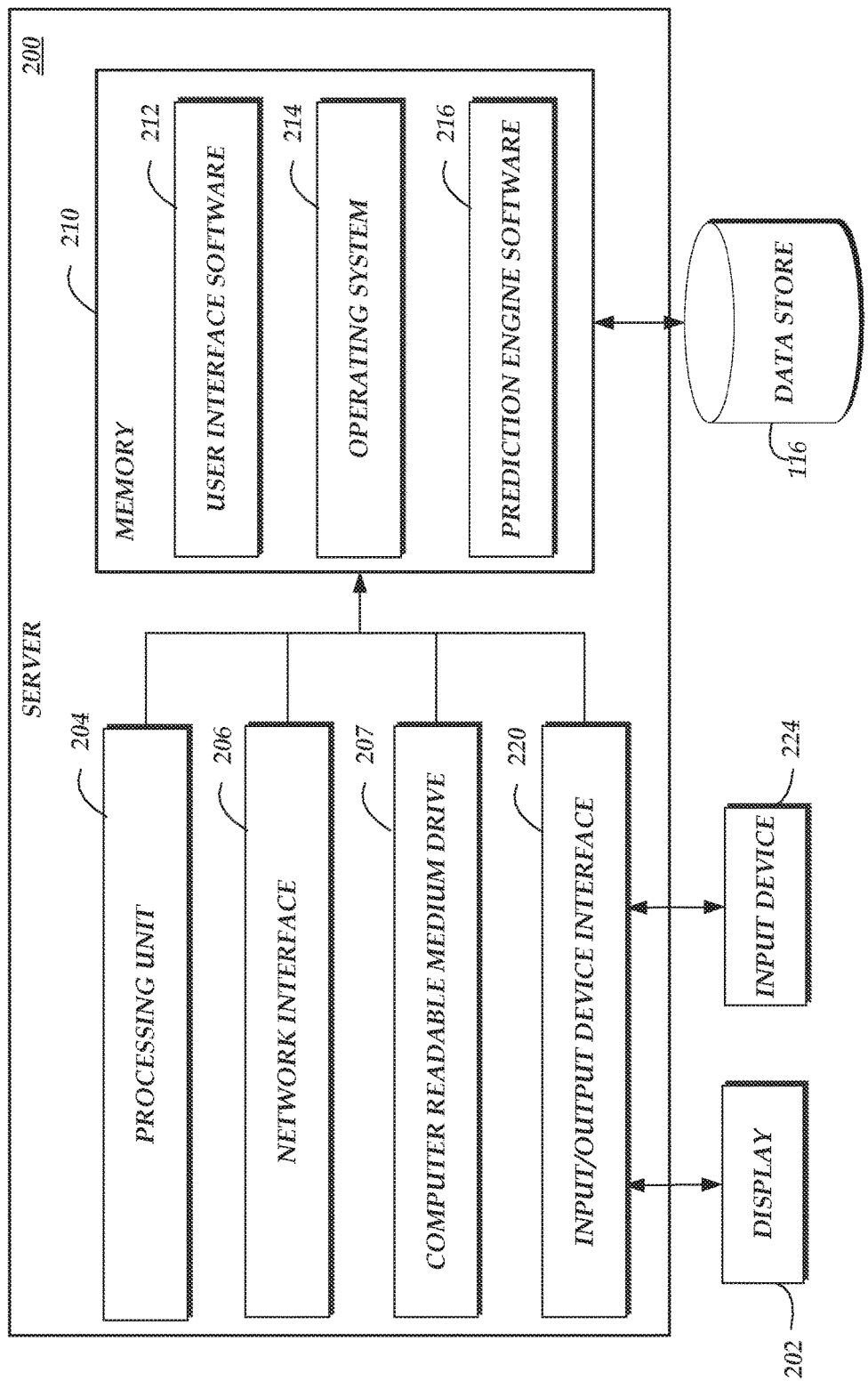
FIG. 2 is a block diagram depicting an illustrative configuration of one embodiment of a server implementing functionalities of a prediction engine of the traffic spike prediction service of FIG. 1.

FIG. 2 depicts one embodiment of an architecture of a server 200 that may implement the traffic spike prediction service 120 described herein. The general architecture of server 200 depicted in FIG. 2 includes an arrangement of computer hardware and software components that may be used to implement aspects of the present disclosure. As illustrated, the server 200 includes a processing unit 204, a network interface 206, a computer readable medium drive 207, an input/output device interface 220, a display 202, and an input device 224, all of which may communicate with one another by way of a communication bus. The network interface 206 may provide connectivity to one or more networks or computing systems, such as the network 104 of FIG. 1. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, etc. In some embodiments, the server 200 may include more (or fewer) components than those shown in FIG. 2. For example, some embodiments of the server 200 may omit the display 202 and input device 224, while providing input/output capabilities through one or more alternative communication channels (e.g., via the network interface 206).

The memory 210 may include computer program instructions that the processing unit 204 executes in order to implement one or more embodiments of the present disclosure. The memory 210 generally includes RAM, ROM and/or persistent or non-transitory memory. The memory 210 may store an operating system 214 that provides computer program instructions for use by the processing unit 204 in the general administration and operation of the server 200. The memory 210 may further include computer program instructions and other information for implementing aspects of the present disclosure. For example, in one embodiment, the memory 210 includes user interface software 212 that generates user interfaces (and/or instructions therefor) for display upon a computing device, e.g., via a navigation interface such as a web browser installed on the computing device. In addition, memory 210 may include or communicate with one or more auxiliary data stores, such as the data store 116. The data store 116 may be any persistent or substantially persistent storage device (e.g., a hard disk drive, solid state disk drive, flash memory, etc.) utilized to store data objects of various providers or other information utilized by the server 200.

In addition to the user interface module 212, the memory 210 may include prediction engine software 216 that may be executed by the processing unit 204. In one embodiment, the prediction engine software 216 implements various aspects of the present disclosure, including processing of traffic information to identify traffic-spike referrers, identification of content for which a spike is likely due to actions of traffic-spike referrers, and communication with other devices (e.g., origin servers 106 or POPs 112) to manage the effects of such a spike.

Figure 3:
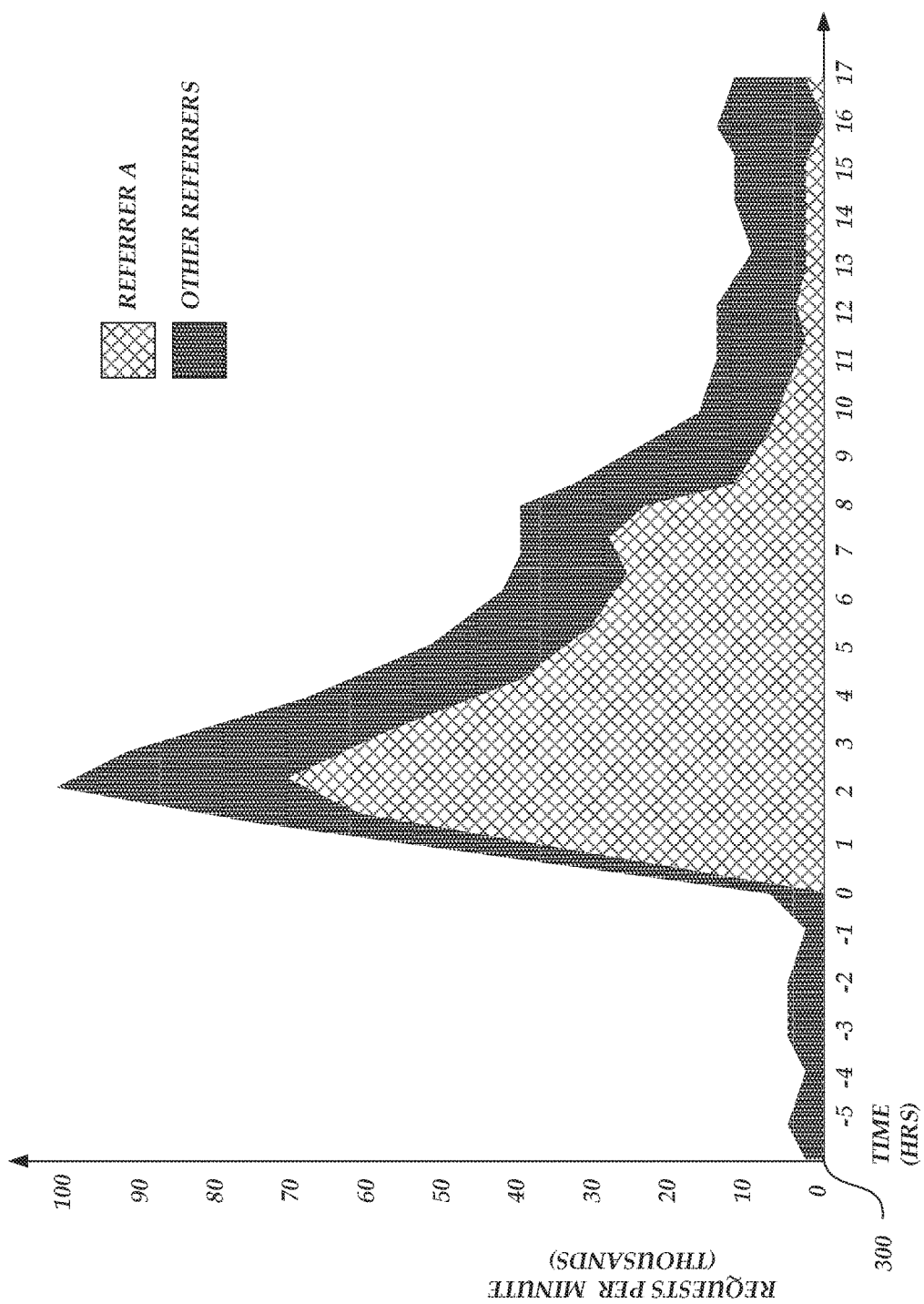
FIG. 3 is an example visualization of traffic volumes during a traffic spike related to requested content.

With reference to FIG. 3, an illustrative visualization of a traffic spike is shown in the form of graph 300. Specifically, graph 300 shows an illustrative example of total requests to access a specific content (e.g., a particular URI) prior to, during, and after a traffic spike. The total requests may represent requests to a single data source (e.g., an origin server 106) or an aggregate number of requests across multiple data sources (e.g., multiple POPs 106, and origin server 106 and multiple POPs 106, etc.). In FIG. 3, the vertical axis of the graph 300 represents a number of requests for the content. Illustratively, each request may correspond to a hypertext transport protocol ("HTTP") GET method request to retrieve content (such as a web page or other network data object) associated with a particular URI. The horizontal axis of graph 300 represents time with respect to the posting of a link to the particular URI by a traffic-spike referrer, such as a news aggregator site or a popular social network account. As such, negative times shown in the graph 300 represent requests to access the content prior to sharing of the link to the content by the traffic-spike referrer, time zero represents a time at which a link to the content is posted by the traffic-spike referrer, and positive times represent requests subsequent to that link being posted. In graph 300, the aggregate requests represented by maximum values in the graph are divided into two portions: those requests identifying the traffic-spike referrer as a referrer for the request, and those requests identifying other referrers (or no referrer). As can be seen in FIG. 3, traffic to the content prior to time zero is relatively low, at under ten thousand requests per hour. After time zero, traffic peaks at one hundred thousand requests per hour, a seventy percent of which identify the traffic-spike referrer. Subsequently, the requests per hour for the content generally falls, with a second peak forming at hours 7 and 8 (which may represent, for example, non-business hours in a populous location, such as the United States) before requests again fall to a level lower than peak levels, though higher than a level prior to time zero.

One of skill in the art will appreciate that the numbers provided in FIG. 3 are intended to be illustrative in nature, and spikes in network traffic may vary in practice. The specific attributes that constitute a "spike" may be set according to operators of the traffic spike prediction service 120. In one embodiment, a spike may be defined as requests for a specific content that, over a given time period, deviate from a prior average number of requests by more than a threshold amount. Illustratively, where data regarding requests for content is collected every hour, a spike may be defined as a number of requests for a current hour that deviates from a rolling average of the prior x hours by at least a threshold amount y, where y may be set as an absolute value (e.g., n thousands of requests) or a relative value (e.g., n standard deviations, n percentage points, etc.). In some instances, the rolling average may omit data collected under "spike" conditions, such that spikes do not affect the moving average. In others instances, the rolling average may decrease the weighting of data collected under "spike" conditions by a predetermined amount. An increased threshold value y may reduce the risk of falsely classifying a spike and the amount of computing resources needed to identify spikes, but increase the risk of undetected spikes, while decreased threshold values may have the opposite effect.

In some embodiments, a spike may be further defined as an increased amount of traffic for a limited period of time, such that traffic volumes decline relative to a peak value within a threshold time period (e.g. 24 hours). For example, to be classified as a "spike," a traffic spike prediction service 120 may require that traffic revert to within a threshold amount z of a rolling average of a prior number of hours, where z is a threshold less than y. In other embodiments, spikes may be defined without regard for whether traffic declines after a detected increase of the threshold amount y.

Figure 4:
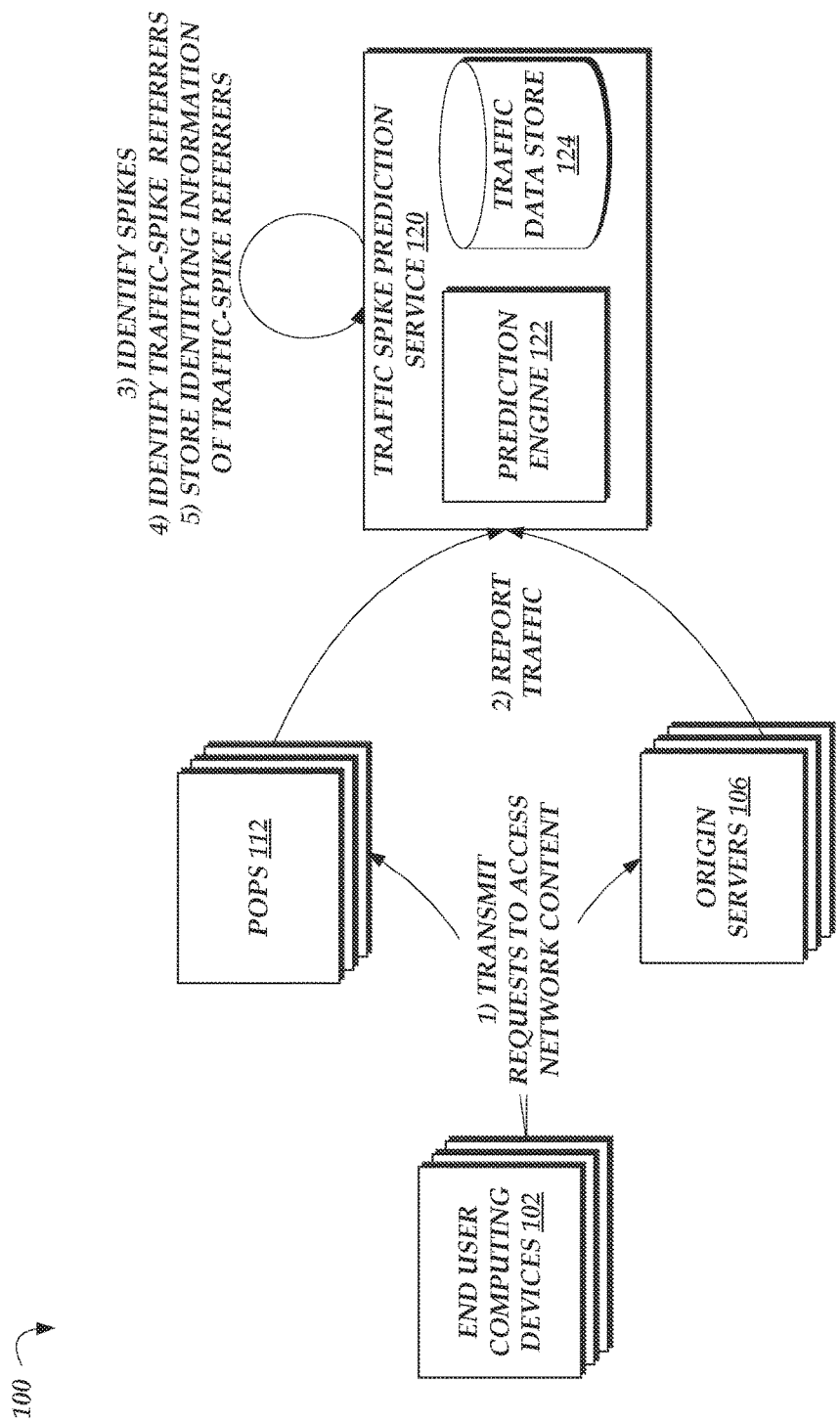
FIG. 4 is a block diagram depicting interactions between end user computing devices, POPs, origin servers, and the traffic spike prediction service 120 to identify traffic-spike referrers indicative of legitimate requests for content.

With reference to FIG. 4, illustrative interactions are shown in which a traffic spike prediction service 120 may identify traffic-spike referrers based on traffic information provided by POPs 112 and origin servers 106. While the interactions of FIG. 4 refer to traffic information provided by both POPs 112 and origin servers 106, one of skill in the art will appreciate that similar interactions can occur with respect to information provided POPs 112 or origin servers 106 individually.

The interactions of FIG. 4 begin at (1), where end user computing devices 102 transmit requests to the POPs 112 and origin servers 106 to access network content. Illustratively, the end user computing devices 102 may transmit HTTP requests to URIs associated with a desired network content. The requests may be generated, for example, by user interaction with a web browser application executing on the end user computing devices 102, such as by user selection of a link posted at a different URI. The requests can in some instances include information indicating a referral source for the request. This information is generally included at a location referred herein as a "referrer field," and can correspond to any data included in the requests that indicates a network content that acts as a referral source for the request. In one embodiment, the referrer field is the HTTP referer header field. In other embodiments, the referrer field may correspond to other metadata included in requests. For example, a web browser application executing on an end user computing device 102 may be configured to determine identifying information of an entity associated with a referring content, such as an account identifier of a social network account (e.g., a username), and to include that identifying information as a header or other metadata within a requested (e.g., within a "account referrer" field). Such a field may be beneficial, for example, when a URI from which content is linked does not uniquely identify an entity that provided the link (e.g., where a URI does not identify a social network account that posted a link to the URI). In one embodiment, the traffic spike prediction service 120 may provide end user computing devices 102 with computer-executable code that may be implemented to determine identifying information of a referring entity. For example, the traffic spike prediction service 120 may provide users with a browser "plugin" including code configured to "scrape" the content of sites visited by a web browser to determine identifying information associated with accounts on one or more social networks, and to append that identifying information to HTTP requests generated based on selection of links on those sites.

After receiving requests, the POPs 112 and origin servers 106 (in addition to their normal operation, such as returning the requested content) report traffic information to the traffic spike prediction service 120, at (2). The traffic information can include, for example, a reference to the various content requested by the end user computing device 102 (e.g., the URIs of requested content), as well as the value of a referrer field included in each request, if present. In one embodiment, the traffic information is reported as 3-tuples, each 3-tuple corresponding to an individual request from an end user computing device and identifying a requested content, a value of a referral field in the request, and a timing of the request. In another embodiment, the traffic information is reported as 4-tuples, each 4-tuple corresponding to multiple requests and identifying a common requested content among the requests, a common value of a referral field among the requests, a number of requests in the multiple requests, and a time period of which the requests were received. In yet another embodiment, the traffic information is reported as "raw" log information, such as server logs, and the traffic spike prediction service 120 is configured to process the log information to identify requests, associated referral field values, and timing information for the requests. Illustratively, the traffic information (or information extracted from the traffic information) is stored within the traffic data store 124.

At (3), the traffic spike prediction service 120 identifies spikes in requests for one or more individual content items. As discussed above, the specific criteria for a spike can value across embodiments, but generally indicates a significant increase in requests for a given content item within a relatively short period of time. Illustratively, a spike can correspond to an increase, in a given reporting period (e.g., 1 hour), of requests to a specific web site that is at least a threshold amount (e.g., n standard deviations, n percentage points, or n absolute requests) away from a moving average of the requests over some number of prior reporting periods.

In one embodiment, the traffic spike prediction service 120 may rank requested content items identified in the stored traffic information, and evaluate requests for each content item in ranked order to determine if the requests satisfy criteria that establish the requests as indicating a spike for the content item. In some instances, the traffic spike prediction service 120 may be configured to evaluate only content items with a threshold number of requests (e.g., ten thousand) over a given time period. Illustratively, setting such a threshold may reduce the need for the traffic spike prediction service 120 to evaluate less popular content items, and thus reduce the computational resources required by the traffic spike prediction service 120.

Thereafter, the traffic spike predictions service 120 evaluates, at (4), each spike to determine whether the spike can correspond to a traffic-spike referrer. Specifically, the traffic spike predictions service 120 may determine, for each spike, whether a significant portion (e.g., 60% or more) of the requests representing the spike include a common value for the referral field. If so, the traffic spike prediction service 120 may mark the common value as identifying a traffic-spike referrer. For example, where requests for a given web site have increased in one hour by 5 standard deviations from a moving average of requests over the past 24 hours, and where 60% of requests in the past hour have shared a common referral field value, it is reasonable to assume that the entity identified in the common referral field value (e.g., another web site or a social network account) may be causing a spike in traffic to the web site. Thus, the traffic spike prediction service 120 may determine that the common referral field value identifies a traffic-spiker referrer. The percentage required to constitute a significant portion of traffic can vary across embodiments, and in some instances may represent less than a majority of traffic (e.g., 25%). While percentages may be used as a metric of significant traffic, in some instances absolute values may also be utilized. For example, where a given value of a referrer field represents at least n absolute requests (e.g., 10 thousand), this absolute number of requests may be determined to represent a significant portion of the requests.

At (5), the traffic spike prediction service 120 stores the identifying information of traffic-spike referrers, such that requests for additional content items that also include identifying information of traffic-spike referrers (e.g., the referral field value attributed to the traffic-spike referrer) can be evaluated as potentially indicative of a spike to that additional content item. In some instances, the traffic spike prediction service 120 stores additional information in conjunction with the identifying information of the traffic-spike referrer. For example, the traffic spike prediction service 120 may store identifying information for content that has already experienced a spike related to the traffic-spike referrer (e.g., to prevent identifying that content as additional content that may experience a spike, since a spike has already occurred or may be occurring with respect to that content). As an additional example, the traffic spike prediction service 120 may store volume information associated with requests of prior spikes related to the traffic-spike referrer. Illustratively, the traffic spike prediction service 120 may store an absolute number of requests included in prior spikes that are associated with the traffic-spike referrer (e.g., 1 million requests for a given content were included in spike of requests to that content and also included a referral field value identifying the traffic-spike referrer). The traffic spike prediction service 120 may further store timing information for those requests (e.g., a distribution of the requests over a period of the corresponding spike). As discussed below, the traffic spike prediction service 120 may use this information in future instances where requests for additional content identify the traffic-spike referrer, to estimate the volume and timing of a predicted spike in requests for the additional content.

While discussed in sequential order for the sake of clarity, the interactions of FIG. 4 may occur in a number of sequences, and in some embodiments may occur concurrently. For example, end user computing devices 102 may continuously transmit requests to the POPs 112 and origin servers 106, and the POPs 112 and origin servers 106 may continuously or intermittently reporting traffic information regarding received requests to the traffic spike prediction service 120. The traffic spike prediction service 120 may continuously or periodically analyze the information as described above to identify traffic-spike referrers. Where periodic analysis is utilized, the period may be selected, for example, according to the computing resources available at the traffic spike prediction service 120 and according to requirements of the service 120 in quickly analyzing data to identify spikes. While an illustrative process for analyzing traffic information at the traffic spike prediction service 120 is described, other mechanisms of analysis are also possible. For example, the traffic spike prediction service 120 may analyze traffic information first to determine a ranked list of referrer field information values, and then, for each value, inspect the requests associated with the value to determine whether the request formed a portion of a spike against a content item and whether a significant number of requests of that spike included the referrer field information value. The traffic spike prediction service 120 may in some embodiments disregard referrer field information values associated with less than a threshold number of requests (e.g., ten thousand requests). The ordering or arrangement of the interactions in FIG. 4 may thus vary across embodiments of the present disclosure.

Figure 5:
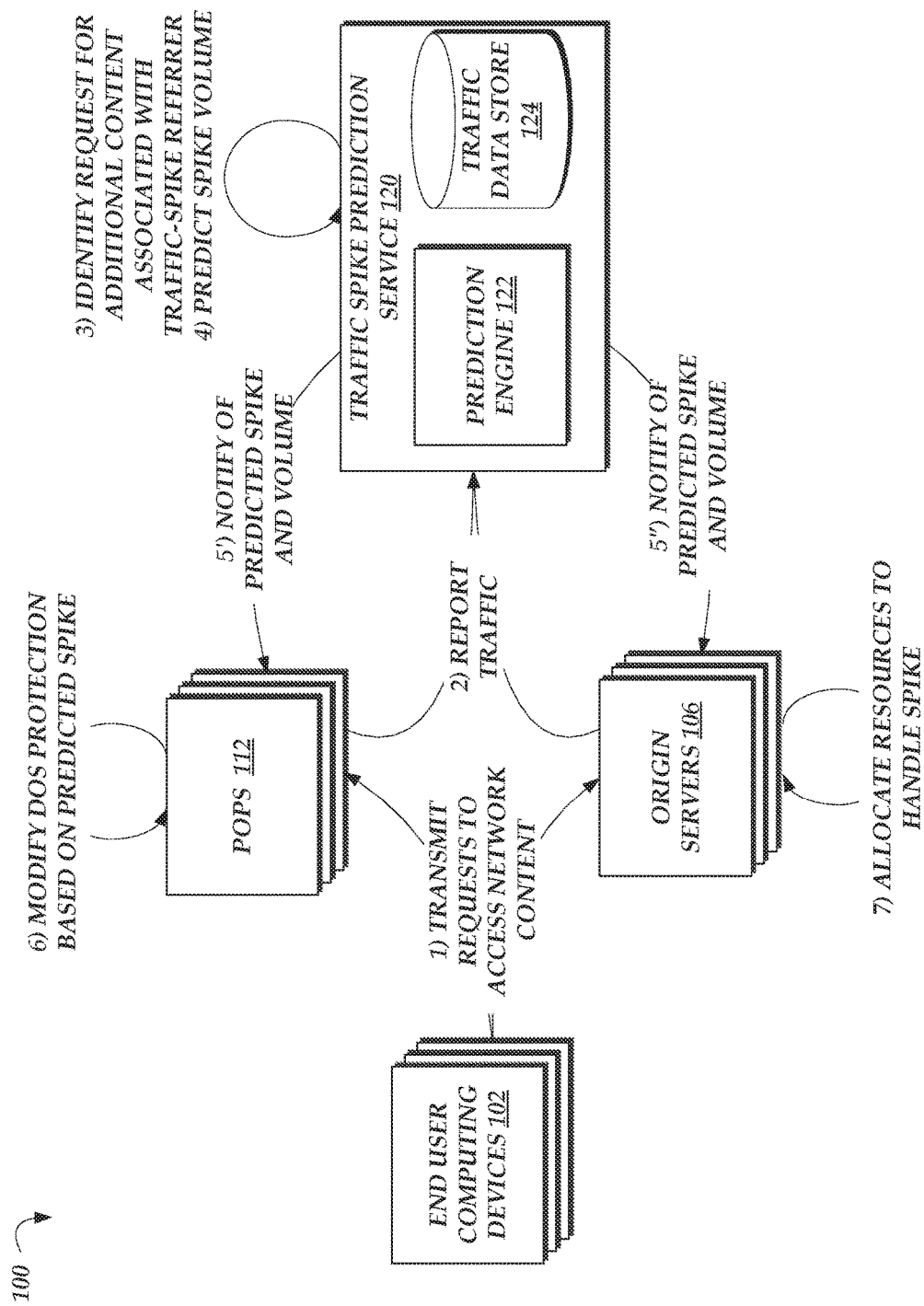
FIG. 5 is a block diagram depicting interactions between end user computing devices, POPs, origin servers, and the traffic spike prediction service 120 to predict legitimate traffic spikes based on a traffic-spike referrer indicated within a request for content.

With reference to FIG. 5, illustrative interactions will be described for utilizing identifying information of a traffic-spike referrer to predict a traffic spike to content provided by the POPs 112 or origin servers 106. Specifically, the interactions of FIG. 5 depict actions of the traffic spike prediction service 120 to detect a request to access a content item, which request includes a referrer field value associated with a traffic-spike referrer, and which content item has not previously been associated with a spike related to that traffic-spike referrer (or which have not been associated with a spike related to that traffic-spike referrer for a threshold period of time).

The interactions of FIG. 5 begin at (1), where the end user computing devices 102 transmit requests to access content on the POPs 112 and origin servers 106, in a similar manner to as described in interaction (1) of FIG. 4. Thereafter, and also in a similar manner as described with reference to FIG. 4, the POPs 112 and origin servers 106, at (2), report traffic information regarding those requests to the traffic spike prediction service 120. In some embodiments, the interactions of FIGS. 4 and 5 may occur at least in part concurrently, and thus interactions (1) and (2) of FIG. 5 may represent the same interactions as the corresponding interactions of FIG. 4.

Thereafter, at (3), the traffic spike prediction service 120 identifies from within the reported traffic information a request for additional content and including a referrer field value corresponding to the traffic-spike referrer. In this context, "additional content" may refer generally to content other than that which was used to identify the traffic-spike referrer, to which a spike was already detected. For example, if a spike of requests to a first URI was utilized to identify a traffic-spike referrer, additional content may correspond to a second URI. Detection of a request to the second URI and including a referrer field value corresponding to the traffic-spike referrer can thus indicate that a spike will occur at the content of the second URI (e.g., because the traffic-spike referrer has posted a link to the second URI, and the traffic-spike referrer has in the past been associated with a significant amount of requests to posted links). In some instances, the traffic spike prediction service 120 may require that "additional content" be wholly new content, for which a request including a referrer field value of the traffic-spike referrer has never before been detected at the traffic spike prediction service 120. In other instances, the traffic spike prediction service 120 may require that "additional content" be content for which a request including a referrer field value of the traffic-spike referrer has not been detected at the traffic spike prediction service 120 in a threshold period of time (e.g., 24 hours). In still other instances, the traffic spike prediction service 120 may require that "additional content" be content for which a threshold number (e.g., one hundred) of requests including a referrer field value of the traffic-spike referrer have not been detected at the traffic spike prediction service 120 in a threshold period of time.

After detecting a request to additional content that includes a referrer field value associated with the traffic-spike referrer, the traffic spike prediction service 120 can further determine a predicted volume of requests to the additional content. Illustratively, the traffic-spike referrer may use an average volume of traffic of past spikes associated with the traffic-spike referrer to predict the volume of a predicted spike at the additional content. For example, if the traffic-spike referrer is associated five past spikes, each of which included one million requests to the content of the respective past spikes, the traffic spike prediction service 120 may predict that a new spike of one million requests will occur with respect to the additional content. In some instances, the average value of past spikes may be time weighted, such that more recent spikes are given more weight within the averaging than past spikes (e.g., to reflect recent changes in popularity of a traffic-spike referrer). Further, the traffic spike prediction service 120 may in some instances calculate other statistical information regarding volumes of past spikes, such as a median volume or a standard deviation in the volumes across the past spikes. In one embodiment, the traffic spike prediction service 120 further calculates a distribution of the volume over time, based on distributions of requests in past spikes. For example, the traffic spike prediction service 120 may use distributions of requests of past spikes to predict a "long tail" distribution of requests in a new spike, such that a first portion of the total volume is received in an early time period and progressively lower levels of requests are received over time. The predicted distribution may be represented similarly to distribution represented by the graph of FIG. 3, discussed above.

At (5') and (5"), the traffic spike prediction service 120 notifies the POPs 112 and origin servers 106 of a predicted spike in requests for the additional content. The POPs 112 may in turn, at (6), modify DoS protection mechanisms to whitelist requests to the additional content or otherwise indicate that these requests are predicted not to represent malicious traffic, as the requests are likely representative of popularity of the traffic-spike referrer rather than of a network attack. In some instances, the POPs 112 may whitelist only traffic to the additional content with a referrer field value of the traffic-spike referrer. In other instances, the POPs 112 may whitelist any traffic to the additional content (e.g., to capture traffic caused by reposting of the link from a site of the traffic-spike referrer). In still other instances, the POPs 112 may reduce the level of analysis on traffic to the additional content, rather than completely whitelisting the content as non-malicious.

Further, at (7), the origin servers 106 may increase the amount of resources used to host the additional content, to enable servicing of requests of the predicted spike. Illustratively, where the origin servers 106 execute within a hosted computing environment, the origin servers 106 may generate and submit a request to the hosted computing environment to increase the amount of computing resources (e.g., processing power, memory, bandwidth, etc.) available to the origin servers 106. In some instances, the origin servers 106 may generate and submit a request to a hosted computing environment to generate additional virtual machines hosting the additional content. Various additional or alternative mechanisms for programmatically increasing computing resources may also be used. In some instances, the amount of increase in computing resources may be based on a predicted volume of a spike and a predicted distribution of that volume. For example, an administrator of the origin servers 106 may establish a correlation between a given amount of computing resources and a predetermined rate of requests (e.g., requests per second). The origin servers 106 may then use a predicted volume and distribution of requests to predict a required level of computing resources during various times of the spike. The origin servers 106 may then programmatically increase computing resources to satisfy the requests of the predicted spike.

In FIG. 5, POPs 112 are discussed as utilizing information of a predicted spike to modify DoS protection mechanisms, while origin servers 106 are discussed as modifying an amount of computing resources available to service requests for additional content. However, these functionalities may occur at either or both the POPs 12 and origin servers 106. For example, an origin server 106 may modify DoS protection mechanism to whitelist requests to additional content, while POPs 112 may increase computing resources available to host the additional content. Moreover, these actions may occur independently, concurrently or in any order. Thus, the ordering and arrangement of interactions in FIG. 5 is intended to be illustrative.

Figure 6:
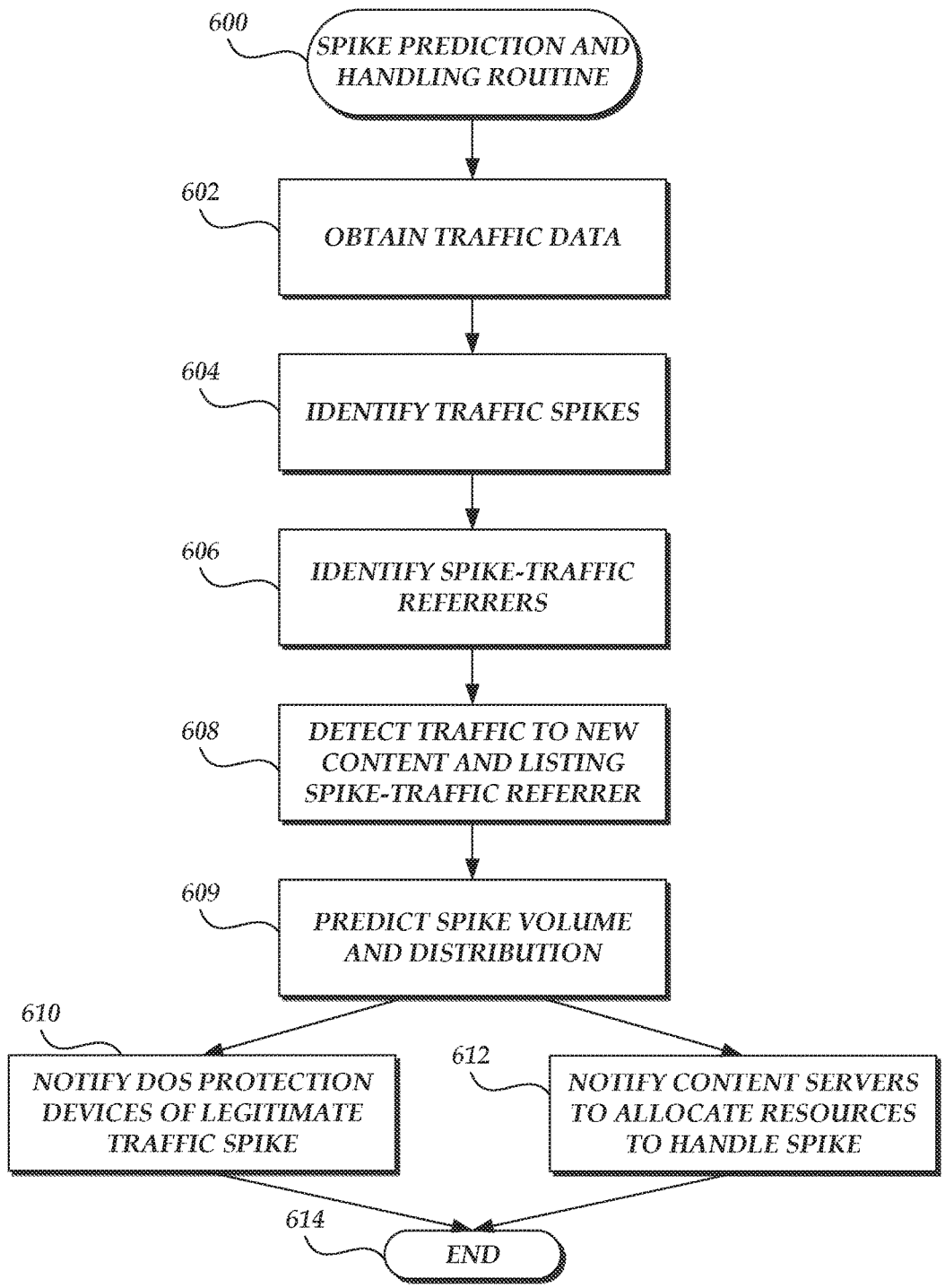
FIG. 6 depicts an illustrative routine for detecting and managing spikes in legitimate network traffic based on a traffic-spike referrer indicated within a request for content.

With reference to FIG. 6, an illustrative routine 600 for identifying traffic-spike referrers, predicting subsequent spikes to additional content, and managing that spike based on the prediction will be described. The routine 600 may be implemented, for example, by the traffic spike prediction service 120 of FIG. 1.

The routine 600 begins at 602, where the traffic spike prediction service 120 obtains traffic information related to requests for content and including referrer field values associated with those requests. The traffic information may be received, for example, from POPs 112 and origin servers 106 of FIG. 1, and may include "raw" data, such as server logs, or processed data, such as tuples indicating timing of requests, the requested content, and referrer field values of the requests.

Thereafter, at block 604, the traffic spike prediction service 120 identifies traffic spikes indicated within the traffic information. In one embodiment, the traffic spike prediction service 120 may identify traffic spikes by ranking content items requested by the requests in the traffic information, and determining whether a pattern of requests for each content satisfies a set of spike criteria. The spike criteria can include, for example, an increase in requests for the content item of at least a threshold amount (e.g., n standard deviations, n percentage points, or n requests as an absolute value) within a given period of time, relative to a past average of requests for the content (e.g., a moving average of a past number of periods). In some instances, the spike criteria can further include a decrease in requests below a peak value of the spike of at least a second threshold amount (e.g., relative to the peak, relative to a past average, etc.).

At block 606, the traffic spike prediction service 120 identifies from the traffic spikes one or more traffic-spike referrers. Illustratively, each traffic-spike referrer may be represented by a referrer field value included in a significant number of requests of one or more of the traffic spikes. As noted above, the number of requests required to constitute a significant number may vary according to embodiments, and may be set as an absolute number of requests or as a percentage of total requests associated with the spike. In some instances, the traffic spike prediction service 120 may require that a traffic-spike referrer be identified on the basis of multiple traffic spikes. For example, the traffic spike prediction service 120 may identify a traffic-spike referrer only if a referrer field value of the traffic spike referrer is included in a significant number of requests for at least n detected traffic spikes. In other instances, the traffic spike prediction service 120 may require that at least a threshold portion of requests including a referrer field value of the traffic-spike referrer be associated with a traffic spike. For example, the traffic spike prediction service 120 may require that at least 50% of requests including a referrer field value of the traffic-spike referrer correspond to a traffic spike (as opposed to requests outside of any traffic spike). In some instances, the threshold portion of requests may be set manually, such as by an administrator of the traffic spike prediction service 120. In other instances, the threshold portion of requests may be dynamically determined by the traffic spike prediction service 120, such as by application of machine learning algorithms to historical traffic information obtained at the traffic spike prediction service 120.

At block 608, the traffic spike prediction service 120 determines a request for additional content (e.g., other than content for which requests have spiked, as determined at block 606) that includes a referrer field value of a traffic-spike referrer. As discussed above, such a request may indicate that the traffic-spike referrer has posted a link to the additional content, and thus the potential that a spike of requests to the additional content may be forthcoming.

At block 609, the traffic spike prediction service 120 predicts a volume and distribution of requests for a spike predicted to occur in requests for the additional content. The volume and distribution can be determined based on a statistical analysis of prior spikes for which requests associated with the traffic-spike referrer for a significant portion of the spike. Illustratively, the volumes and distribution may be determined by averaging volumes and distributions of the prior spikes, potentially with each prior spike weighted according to its recency.

At blocks 610 and 612, the traffic spike prediction service 120 transmits a notification to relevant parties that a spike is predicted to occur. Specifically, at block 610, the traffic spike prediction service 120 transmits a notification to a DoS protection device, such as a network router, that a spike in requests for the additional content is predicted to occur, and that such traffic is likely legitimate. As noted above, the DoS protection device may then modify its mechanisms such that traffic to the additional content (and potentially traffic including a referrer field value associated with the traffic-spike referrer) is subjected to reduced scrutiny, or is whitelisted with respect to DoS analysis. In addition, at block 612, the traffic spike prediction service 120 transmits a notification to a host of the additional content (e.g., one or more origin servers 106 or POPs 112) that a spike of requests for the additional content is predicted to occur. As discussed above, the traffic spike prediction service may then increase an availability of computing resources to service requests for the additional content. The routine 600 may then end at block 614.

All of the methods and processes described above may be embodied in, and fully automated via, software code modules executed by one or more general purpose computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A content delivery system comprising:
one or more server computing devices to receive requests for user computing devices for at least two content items, and to return the content items in response to the requests;
an attack detection system comprising a processor and memory and configured to detect network attacks directed to the one or more server computing devices and to block requests associated with the network attacks; and
a spike prediction system comprising a processor configured with computer-executable instructions to:
obtain traffic information regarding the requests for the at least two content items, the traffic information identifying, for individual requests, referrer field values of the individual requests, wherein the referrer field values identify, for an individual request, an entity that provided a link to a content item, of the at least two content items, being requested by the individual request;
identify, from the traffic information, a traffic spike to a first content item of the at least two content items, the traffic spike representing an increase in requests for the first content item within a time period relative to a historical average of requests for the first content item;
determine a referrer field value shared among at least a threshold number of requests forming a portion of the traffic spike;
identify, from the traffic information, a request for a second content of the at least two content items that includes the referrer field value; and
transmit a notification to the attack detection system and the one or more server computing devices of an expected traffic spike to the second content;
wherein the one or more server computing devices are configured to respond to the notification by increasing an amount of computing resources at the one or more server computing devices available to respond to requests for the second content; and
wherein the attack detection system is configured to respond to the notification by declining to identify requests for the second content as malicious.

2. The content delivery system of claim 1, wherein the referrer field values are values of a hypertext markup language (HTML) referer header field.

3. The content delivery system of claim 1, wherein the referrer field values identify a uniform resource identifier (URI) associated with at least one of a social network account, a news aggregator, a mobile device application, or a web site.

4. The content delivery system of claim 1, wherein the threshold number of requests is relative to a total number of requests forming the traffic spike.

5. A system comprising:
a memory storing computer-executable instructions; and
a processor in communication with the memory and configured to execute the computer-executable instructions, wherein execution of the computer-executable instructions causes the system to:
obtain traffic information regarding the communications addressed to at least two network objects associated with a computing system, the traffic information identifying a referrer field value of a communication, wherein the referrer field value identifies an entity that provided a link to a first network object, of the at least two network objects, to which the communication is transmitted;

identify, from the traffic information, a traffic spike to a first network address of the at least two network objects, the traffic spike representing an increase in communications to the first network object within a time period;

determine a referrer field value shared among at least a threshold number of communications forming a portion of the traffic spike;

identify, from the traffic information, a communication to a second network object of the at least two network objects that includes the referrer field value; and transmit a notification of an expected traffic spike to the second network object, wherein the notification indicates that communications to the second network object are predicted not to be malicious.

6. The system of claim 5 further comprising a detection system configured to analyze communications to the second network object as potentially malicious.

7. The system of claim 6, wherein the detection system is configured to reduce analysis of communications to the second network object at least partly by whitelisting communications to the second network object that include the referrer field value.

8. The system of claim 5, wherein execution of the computer-executable instructions further causes the processor to increase an amount of computing resources at the computing system available to service communications to the second network object.

9. The system of claim 8, wherein the computing system comprises a plurality of virtual computing devices implemented within a hosted computing environment, and wherein execution of the computer-executable instructions causes the system to increase the amount of computing resources at the computing system available to service communication to the second network object at least partly by transmitting a request to the hosted computing environment to increase a number of virtual computing devices within the plurality of virtual computing devices.

10. The system of claim 5, wherein the threshold number of requests is an absolute number of requests.

11. The system of claim 5, wherein the communications received at a computing system to the at least two network objects are generated by client computing devices, and wherein the referrer field values are metadata generated by web browser applications executing on the respective client computing devices.

12. The system of claim 5, wherein execution of the computer-executable instructions further causes the processor to determine, from the traffic information, that a prior traffic spike to the second network object and associated with the referrer field value has not occurred within a threshold period of time.

13. The system of claim 12, wherein the first network object and the second network object are the same network object.

14. A computer-implemented method comprising:
obtaining traffic information regarding requests received at a server computing system for at least two content items, the traffic information identifying, for a request, referrer field values of the request, wherein the referrer field values identify an entity that provided a link to a content item, of the at least two content items, being requested;

identifying, from the traffic information, a traffic spike to a first content item of the at least two content items, the traffic spike representing an increase in requests for the first content item within a time period;

determining a referrer field value shared among at least a threshold number of requests forming a portion of the traffic spike;

identifying, from the traffic information, a request for a second content of the at least two content items that includes the referrer field value; and notifying a network device of an expected traffic spike to the second content that is predicted not to be malicious.

15. The computer-implemented method of claim 14 further comprising increasing the amount of computing resources at the server computing system available to service requests for the second content at least partly by increasing an availability of at least one of processing power, memory, or network bandwidth to the server computing system.

16. The computer-implemented method of claim 15, wherein the server computing system comprises a plurality of virtual computing devices, and wherein increasing the amount of computing resources at the server computing system available to service requests for the second content comprising adding additional virtual computing devices to the plurality of virtual computing devices.

17. The computer-implemented method of claim 14 further comprising transmitting a notification of an expected traffic spike to the second content, wherein the notification causes analysis of requests for the second content to detect malicious traffic.

18. The computer-implemented method of claim 14 further comprising predicting, based at least in part on a volume of requests to the first content item, a volume of requests constituting an expected traffic spike to the second content.

19. The computer-implemented method of claim 18, wherein the volume of requests within constituting expected traffic spike to the second content is further predicted based on the portion of the traffic spike to the first content item sharing the referrer field value.

20. The computer-implemented method of claim 14 further comprising predicting, based at least in part on a time distribution of requests within the traffic spike to the first content item, a time distribution of requests within an expected traffic spike to the second content.

21. The computer-implemented method of claim 14, wherein the increase in requests for the first content item within the time period is at least one of an increase of at least a number of standard deviations relative to a historical average, an increase of at least a percentage relative to the historical average, or an increase of at least an absolute number of requests.

* * * * *